United States Patent
Schudy

[11] 3,820,243
[45] June 28, 1974

[54] TYPODONT BRACKET
[76] Inventor: Fred Frank Schudy, 2615 Cameron, Houston, Tex. 77006
[22] Filed: June 26, 1973
[21] Appl. No.: 373,678

[52] U.S. Cl. ................................................. 32/71
[51] Int. Cl. ............................................. A61c 9/00
[58] Field of Search .............................. 32/14 A, 71

[56] References Cited
UNITED STATES PATENTS
2,005,114  6/1935  Spitzer et al. ........................... 32/71
3,250,003  5/1966  Collito .............................. 32/14 A
3,422,536  1/1969  Garson ................................. 32/71

Primary Examiner—Robert Peshock

[57] ABSTRACT

The typodont bracket includes a bracket secured to an arcuate base plate having a threaded screw attached thereto for threadingly engaging a typodont tooth whereby the bracket may be secured to the tooth.

1 Claim, 5 Drawing Figures

PATENTED JUN 28 1974  3,820,243

TYPODONT BRACKET

BACKGROUND OF THE INVENTION

1. Field of the Invention

This invention pertains to orthodontics and more particularly relates to means of attaching orthodontic brackets to a typodont.

2. Description of the Prior Art

The art of Orthodontics is the correction of irregularities of the teeth. For the purpose of studying the mechanotherapy of orthodontic treatment, such as the rotating of the teeth into proper position, the shifting of a tooth to close a void caused by the extraction of a tooth, the uprighting of the teeth in the dental arch, the aligning of the teeth in a proper arch form, and the co-ordinating of the lower dental arch with the upper dental arch; the dental arches and teeth are simulated by reproducing them in metal or plastic to form a typodont. The student then studies by applying certain orthodontic apparatus and appliances to the typodont. Such appliances include arch wires, brackets, buccal tubes, various springs, elastic bands, and headgear, to name a few. The teeth of the typodont may be removable or non-removable.

In the typical treatment of a patient an arch wire is positioned around the outer periphery of the dental arch extending from the posterior teeth on one side of the dental arch to the posterior teeth on the other side of the dental arch. Similar arrangements are employed on both the upper and lower dental arches. The arch wires are secured to the teeth by brackets attached to each tooth. The arch wire is then anchored to one of the posterior teeth, generally the second molars, by means of a buccal tube which is likewise secured to the anchor tooth.

In the use of the typodont as a study aid, it has become necessary to attach the brackets to the typodont teeth as an orthodontist would so attach the bracket to a patient's teeth. Therefore such brackets would be secured to the typodont teeth by means of a metal band which circumscribes each tooth and to which the brackets are attached. This requires the construction of a band around each typodont tooth and the cementing of each band to the tooth. Such a procedure consumes much time and is expensive.

SUMMARY OF THE INVENTION

The typodont bracket includes a bracket mounted on a screw. The bracket is attached to a typodont tooth by threading the hole in the tooth or by having the screw self-tapping. Such an installation is much faster and less expensive than the previous use of cemented metal bands.

Other objects and advantages of the invention will appear from the following description.

BRIEF DESCRIPTION OF THE DRAWINGS

For a detailed description of a preferred embodiment of the invention, reference will now be made to the accompanying drawing wherein.

DESCRIPTION OF THE PREFERRED EMBODIMENT

Figure 1:
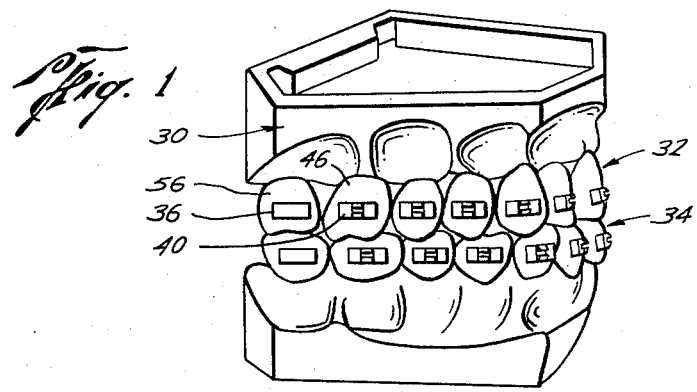
FIG. 1 is a perspective of a typodont having one embodiment of the typodont bracket shown.

Referring now to FIG. 1, a typodont 30, is constructed by making a cast of an upper and lower dental arch thereby producing typodont arches 32, 34. Typodont 30 is a plastic or metal simulation of real dental arches. The teeth forming arches 32, 34 are also of plastic or metal and may or may not be removable.

Since typodont 30 is used for study purposes, to further stimulate the environment, buccal tube 36 and bracket 40 are secured to typodont teeth 56, 46 respectively.

Figure 2:
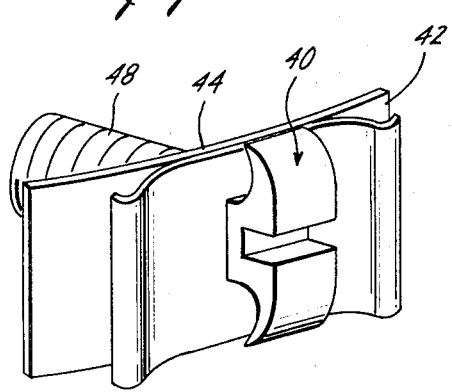
FIG. 2 is a perspective of one embodiment of the typodont bracket.
Figure 3:
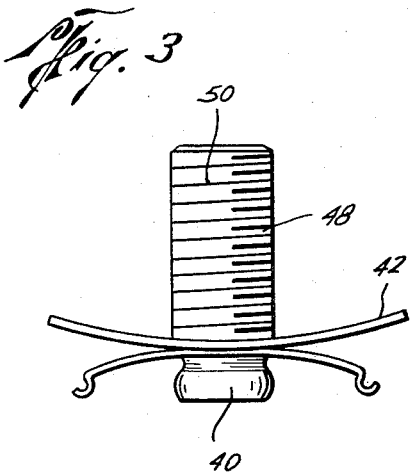
FIG. 3 is a plan view of the typodont bracket shown in FIG. 2.

Referring now to FIGS. 2 and 3, there is shown a standard bracket 40 centered and mounted on an arcuate base plate 42. Base plate 42 is a generally ribbon-like metal member having a thickness of a few thousandths of an inch and having a small bow 44 generally conforming to the outer periphery of the typodont teeth such as tooth 46. Base plate 42 may include a piece of metal band material. In the embodiment of FIGS. 2 and 3 a rod-like member or bolt 48 is affixed to base plate 42 at approximately the center of base plate 42. Bolt 48 may be made integral with base plate 42 or may be brazed or soldered to base plate 42. A hole or bore (not shown) is drilled into tooth 46. The bore may or may not be tapped (internally threaded) for engagement with external threads 50 on bolt 48. If the bore is not tapped, threads 50 may be self-tapping threads for threading the internal surface of the bore as threads 50 threadingly engage tooth 46.

Figure 4:
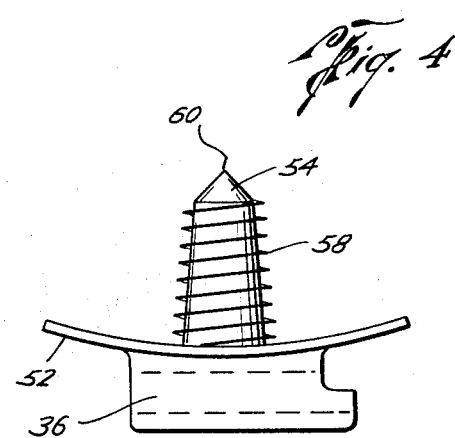
FIG. 4 is a plan view of another embodiment of a typodont bracket.
Figure 5:
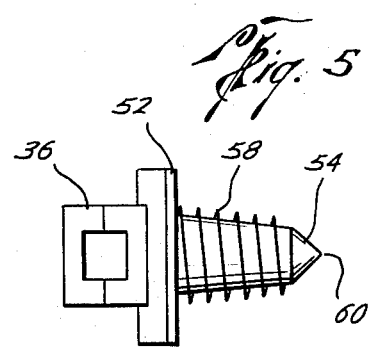
FIG. 5 is a side view of the typodont bracket shown in FIG. 4.

Another embodiment is shown in FIGS. 4 and 5, and for illustration purposes, buccal tube 36 has been shown. Tube 36 is again affixed to an arcuate base plate 52 like that of base plate 42. However, a screw 54 has been secured to base plate 52. Screw 54 does not require a bore in tooth 56 since screw 54 includes self-tapping threads 58 terminating at a point 60.

In both embodiments, the bracket 40 or tube 36 is rotated with either bolt 48 entering a bore in the typodont tooth or screw 54 self-tapping a bore thereby affixing bracket 40 and tube 36 to the typodont teeth without the use of time consuming and expensive metal bands. Upon securing bracket 40 and tube 36, the arch wires may be installed on the typodont for studying orthodontic treatment.

While a preferred embodiment of the invention has been shown and described, modifications thereof can be made by one skilled in the art without departing from the spirit of the invention.

I claim:

1. An orthodontic appliance for attachment to an artificial tooth of a typodont comprising:

a ribbon-like metal base plate having a thickness of a few thousandths of an inch and having a small bow conforming to the outer periphery of the typodont tooth;

a rod-like threaded member having self-tapping threads terminating at a point for threading into the internal surface of a bore in the typodont tooth; said threaded member being integral with said base plate; and an arch wire securement means affixed to said base plate to secure an arch wire whereby upon rotation of said securement means, base plate, and threaded member relative to the typodont tooth, said securement means becomes releasably attached to the typodont tooth.

* * * * *